US008035728B2

(12) United States Patent
Subbotin et al.

(10) Patent No.: US 8,035,728 B2
(45) Date of Patent: Oct. 11, 2011

(54) METHOD AND APPARATUS PROVIDING RULE-BASED AUTO EXPOSURE TECHNIQUE PRESERVING SCENE DYNAMIC RANGE

(75) Inventors: Igor Subbotin, South Pasadena, CA (US); Ilia Ovsiannikov, Studio City, CA (US)

(73) Assignee: Aptina Imaging Corporation, George Town (KY)

( * ) Notice: Subject to any disclaimer, the term of this patent is extended or adjusted under 35 U.S.C. 154(b) by 652 days.

(21) Appl. No.: 12/163,680

(22) Filed: Jun. 27, 2008

(65) Prior Publication Data

US 2009/0322901 A1 Dec. 31, 2009

(51) Int. Cl.
*H04N 5/238* (2006.01)
*G03B 7/00* (2006.01)
(52) U.S. Cl. .......................... 348/364; 348/366; 348/362
(58) Field of Classification Search ............... 348/222.1, 348/229.1, 230.1, 254, 362–368; 382/168–172
See application file for complete search history.

(56) References Cited

U.S. PATENT DOCUMENTS

| 4,969,045 | A | * | 11/1990 | Haruki et al. ............... 348/229.1 |
| 5,510,837 | A | * | 4/1996 | Takei ............................ 348/362 |
| 5,596,387 | A | | 1/1997 | Takagi |
| 5,623,706 | A | | 4/1997 | Kosako |
| 6,374,054 | B1 | | 4/2002 | Schinner |
| 6,734,913 | B1 | | 5/2004 | Motta |
| 2001/0007473 | A1 | | 7/2001 | Chuang et al. |
| 2003/0030729 | A1 | | 2/2003 | Prentice et al. |
| 2004/0120599 | A1 | | 6/2004 | Henley |
| 2004/0207734 | A1 | | 10/2004 | Horiuchi |
| 2004/0246549 | A1 | | 12/2004 | Buchholz |
| 2006/0033825 | A1 | | 2/2006 | Li et al. |
| 2006/0082676 | A1 | | 4/2006 | Jenkins et al. |
| 2006/0268136 | A1 | | 11/2006 | Kaplinsky |
| 2007/0002159 | A1 | | 1/2007 | Olsen et al. |
| 2007/0040035 | A1 | | 2/2007 | Kotlarsky et al. |
| 2007/0104475 | A1 | | 5/2007 | Cheng |
| 2007/0160357 | A1 | | 7/2007 | Lin et al. |
| 2007/0195175 | A1 | | 8/2007 | Silverbrook |
| 2007/0215706 | A1 | | 9/2007 | Kotlarsky et al. |

FOREIGN PATENT DOCUMENTS

| EP | 0 446 647 A2 | 9/1991 |
| GB | 2 258 317 A | 2/1993 |
| JP | 2005-117388 | 4/2005 |
| KR | 2004-0085933 | 10/2004 |
| TW | 252959 B | 4/2006 |

OTHER PUBLICATIONS

Su, Mu-Chun et al., "New Compensation Algorithm for Color Backlight Image", Proceedings of the 2002 International Joint Conference on Neural Networks, vol. 2, pp. 1396-1400, 2002.
Shimizu, Suji et al., "A New Algorithm for Exposure Control Based on Fuzzy Logic for Video Cameras", IEEE Transactions on Consumer Electronics, vol. 38, Issue 3, pp. 617-623, Aug. 1992.
Chan, Wen-Hsin et al., "Video CCD Based Portable Digital Still Camera", IEEE Transactions on Consumer Electronics, vol. 41, Issue 3, pp. 455-459, Aug. 1995.

* cited by examiner

*Primary Examiner* — Sinh Tran
*Assistant Examiner* — Mark Monk
(74) *Attorney, Agent, or Firm* — Jason Tsai

(57) ABSTRACT

A method and apparatus for applying exposure compensation to an image. Exposure correction limits inclusion of, but does not ignore, image highlights and lowlights.

15 Claims, 14 Drawing Sheets

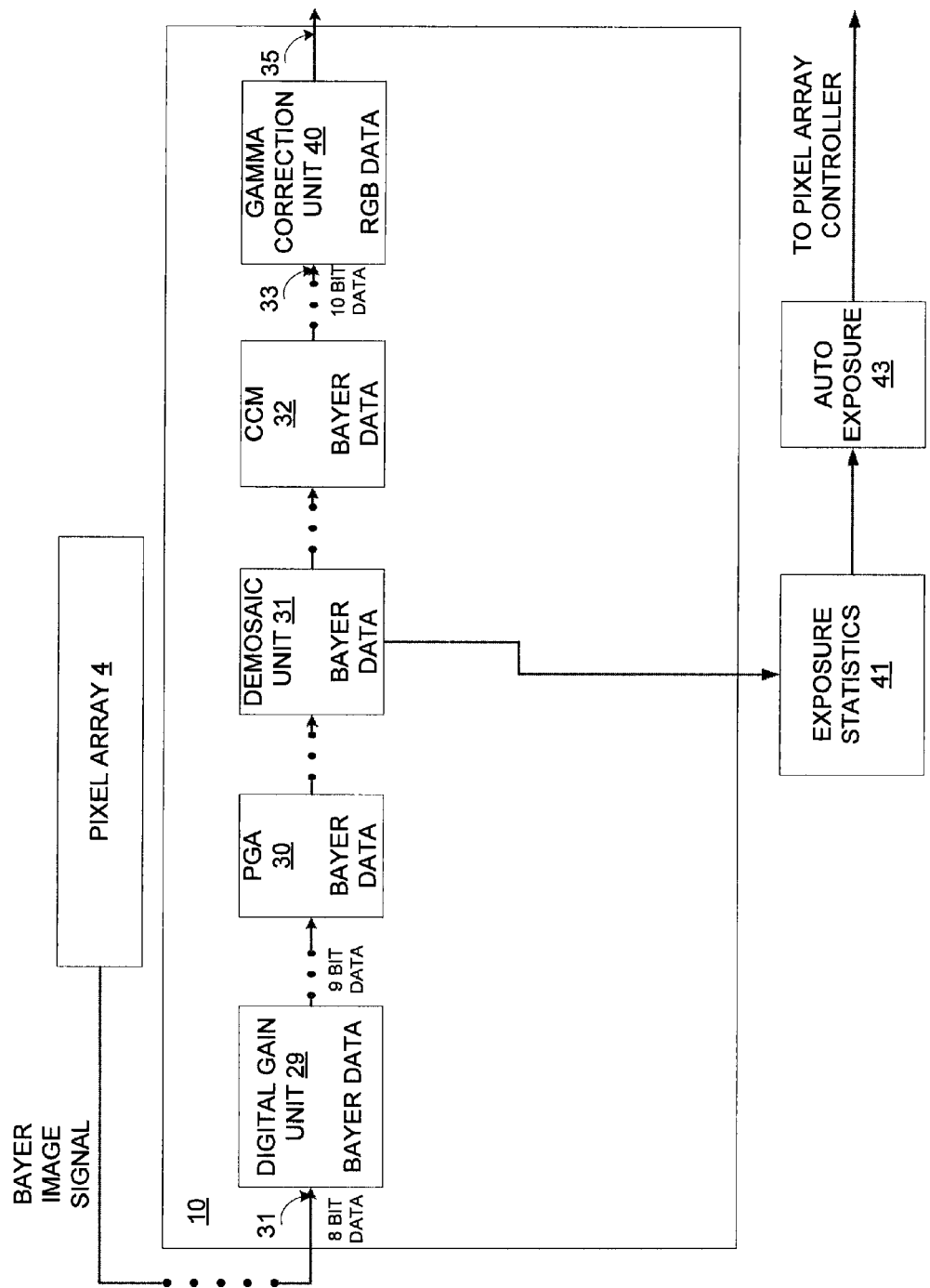

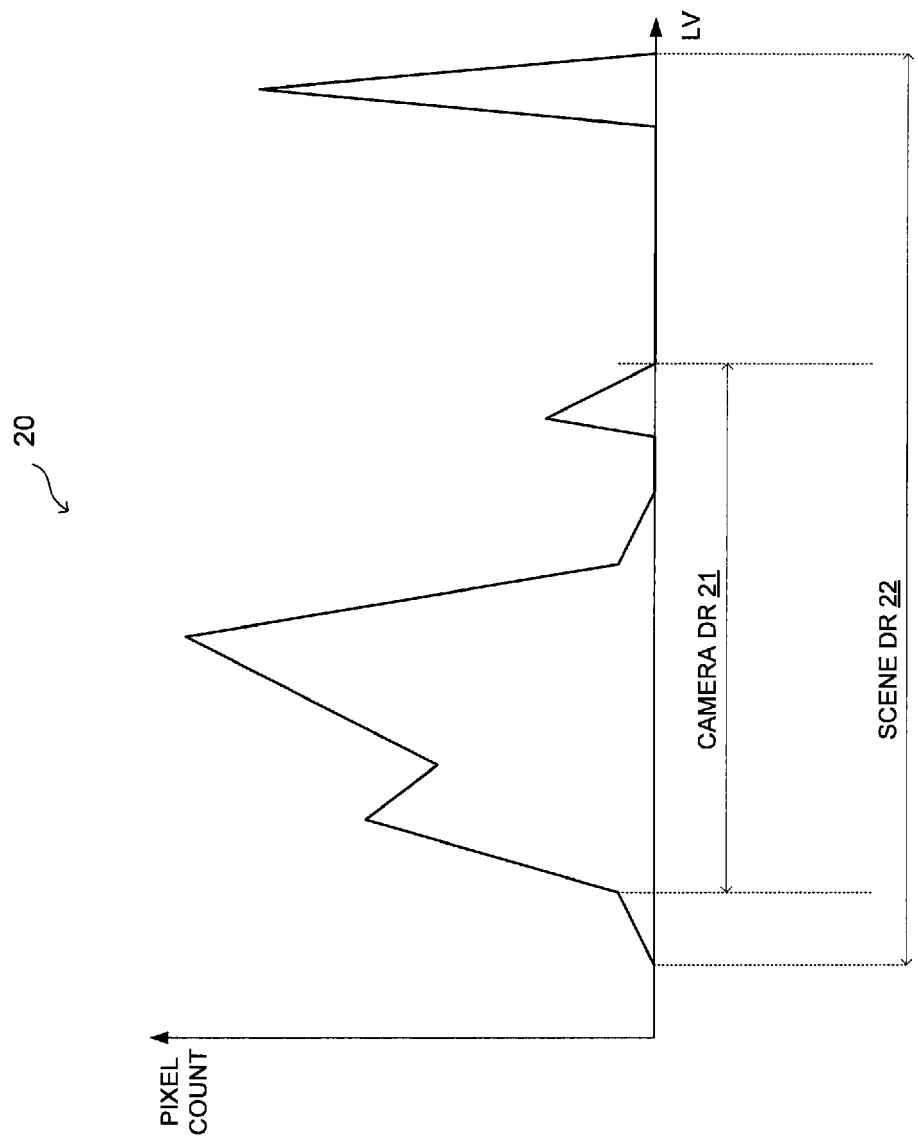

METHOD AND APPARATUS PROVIDING RULE-BASED AUTO EXPOSURE TECHNIQUE PRESERVING SCENE DYNAMIC RANGE

FIELD OF THE INVENTION

Embodiments described herein relate generally to image acquisition and processing and more specifically to selecting correct exposure for an acquired image.

BACKGROUND OF THE INVENTION

Solid state imagers such as CCD, CMOS, and others, are in widespread use. CMOS image sensors are increasingly being used as a lower cost alternative to CCDs. A CMOS image sensor circuit includes a focal plane array of pixels, each one of the pixels includes a photogate, photoconductor, or photodiode having an associated charge accumulation region within a substrate for accumulating photo-generated charge. Each pixel may include a transistor for transferring charge from the charge accumulation region to a storage region and another transistor for resetting the storage region to a predetermined charge level prior to charge transfer. The pixel may also include a source follower transistor for receiving and amplifying charge from the storage region and an access transistor for controlling the readout of the pixel contents from the source follower transistor which receives the charge.

FIG. 1 shows one example of a CMOS imaging sensor 1 that includes a CMOS active pixel sensor ("APS") pixel array 4 and a controller 6 that provides timing and control signals to enable the readout of image signals captured and stored in the pixels in a manner commonly known to those skilled in the art. Example arrays have dimensions of M×N pixels, with the size of the array 4 depending on a particular application. The imager pixel signals, typically in the form of reset signal Vrst and photosensor signal Vsig are read out a row at a time using a column parallel readout architecture. The controller 6 selects a particular row of pixels in the array 4 by controlling the operation of row addressing circuit 2 and row drivers 3. Signals stored in the selected row of pixels are provided on respective column output lines to a readout circuit 7. The signals read from each of the columns are read out sequentially or in parallel using a column addressing circuit 8. The Vrst and Vsig signals are typically subtracted to provide an image signal free from certain types of noise. The readout analog Vrst and Vsig signals for each pixel are subtracted and are converted to digital values by an analog-to-digital ("A/D") converter 9 and then processed by an image processor 10.

CMOS image sensors of the type discussed above are generally known as discussed, for example, in Nixon et al., "256×256 CMOS Active Pixel Sensor Camera-on-a-Chip," IEEE Journal of Solid-State Circuits, Vol. 31(12), pp. 2046 2050 (1996); and Mendis et al., "CMOS Active Pixel Image Sensors," IEEE Transactions on Electron Devices, Vol. 41(3), pp. 452 453 (1994). See also U.S. Pat. Nos. 6,177,333 and 6,204,524, which describe operation of conventional CMOS image sensors and U.S. Pat. No. 7,141,841, which describes an imager having extended dynamic range, assigned to Micron Technology, Inc.

FIG. 2 depicts a portion of the FIG. 1 sensor 1 and more details of the image processor 10. Image processor 10 receives digital signals on line 31 from the pixel array 4 and upstream circuits (not shown). The illustrated portion of the image processor 10 is typically constructed as an image processing pipeline. The dotted lines represent omitted circuits performing upstream processing tasks. Typically, the incoming pixel signals, in the form of Bayer pixel data, are received by a digital gain unit 29, which may amplify one or more of the pixel signals, which are then are provided to a PGA (positional gain amplifier) 30 that selectively amplifies the Bayer pixel signals based on their pixel location in the pixel array 4. The digital gain unit 29 amplifies the pixel signals per pre-imposed design or by need. The PGA 30 also applies gains to the image signal per pre-imposed design or by need. The dotted line between the digital gain unit 29 and PGA 30 represents other processing circuits performing other pixel signal processing tasks, which may be provided between the two.

After processing by the PGA 30 and other possible processing circuits, which operate on the Bayer pixel signals, the Bayer pixel signals are demosaiced by a demosaicing unit 31 to provide RGB data for each pixel. The RGB data is subsequently color corrected by a color correction matrix (ccm) 32. Following color correction, other processing may be performed on the RGB pixel data and the color corrected RGB pixel data is then provided to a Gamma correction unit 40. The Gamma correction unit 40 applies linear luminance to the RGB pixel signals. The application of Gamma correction may be one of many different processing steps that are applied to the RGB image pixel signals before being provided downstream for printing, display, and/or storage.

For automatic exposure, statistics of the RGB image can be collected by an exposure statistics processing unit 41 at the output of the demosaic unit 31, processed and provided to an automatic (auto) exposure algorithm 43 for use in determining a proper image exposure setting based on an average image luminance.

Image sensors having a pixel array have a characteristic dynamic range. Dynamic range refers to the range of incident light that can be accommodated by the pixels of the array in a single frame of pixel data. It is desirable to have an image sensor with a high dynamic range to image scenes that generate high dynamic range incident signals, such as indoor rooms with windows to the outside, outdoor scenes with mixed shadows and bright sunshine, night-time scenes combining artificial lighting and shadows, and many others.

The dynamic range for an image sensor is commonly defined as the ratio of its largest non-saturating pixel signal to the standard deviation of noise under dark conditions. The dynamic range is limited on an upper end by the charge saturation level of the photosensors, and on a lower end by noise imposed limitations and/or quantization limits of the analog-to-digital converter used to produce the digital pixel signals. When the dynamic range of an image sensor is too small to accommodate the variations in light intensities of the imaged scene, a captured image may have limited dynamic range.

In conventional imager processing systems, conventional auto exposure techniques attempt to achieve an average image luminance at a certain target level, where the auto exposure target can be established in advance and/or at the time of image capture to best capture the dynamic range of the scene. Additionally, the auto exposure target can be set by the imaging sensor with or without input by the user of the imaging sensor. An advantage of conventional auto exposure techniques based on the average image luminance is that they are easily implemented and can provide fast and smooth behavior.

One of the problems with digital image capture occurs when portions of, or an entirety of, a captured image are not equally lit. Some portions of an image may have lowlights, highlights, or may have backlighting. Another problem is that portions of, or an entirety of, a captured image are not properly lit where the overall image is extremely brightly lit, dimly lit, or has low-contrast content. Conventional techniques relying on average image luminance do not always effectively compensate for an image that lacks uniform luminance or has other problems. As a result, conventional auto exposure techniques relying on average image luminance to determine image exposure may not set the best exposure to adequately capture a full dynamic range of a scene resulting in images that, for example: have a subject that is underexposed due to backlighting; have brightly sun lit outdoor scenes which appear too dark; have night scenes that look too bright; produce dull, low-contrast images; and/or produce images with clipped highlights with reduced dynamic range. Therefore, it is desirable to have an auto exposure technique that at least mitigates some of these problems and better sets exposure to improve the capture of the dynamic range of the scene.

BRIEF DESCRIPTION OF THE DRAWINGS

FIG. 2 depicts a portion of an image processor circuit that receives image signals from a pixel array.

FIG. 3 depicts a mapping of a scene's dynamic range and a camera's dynamic range of the same scene.

DETAILED DESCRIPTION OF THE INVENTION

Figure 1:
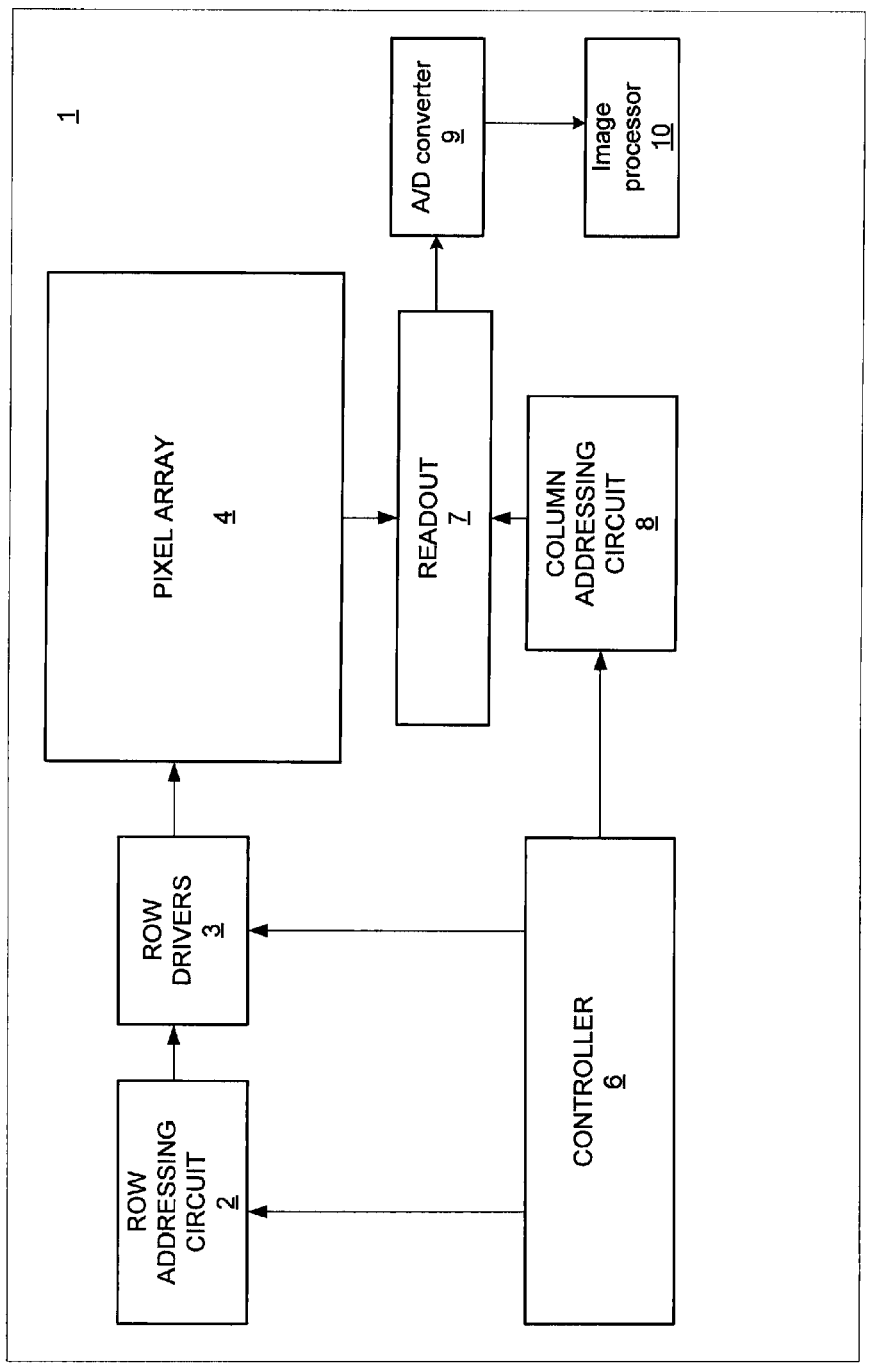
FIG. 1 is a block diagram of a conventional CMOS imager.

In the following detailed description, reference is made to the accompanying drawings, which form a part hereof, and in which is shown by way of illustration specific embodiments that may be practiced. These embodiments are described in sufficient detail to enable those of ordinary skill in the art to make and use them and it should be appreciated that structural, logical, or procedural changes may be made to the specific embodiments disclosed herein.

In an embodiment, a rule-based auto exposure technique modifies the exposure setting determined by an average image luminance auto exposure algorithm to adjust the exposure setting to capture an image in a manner that permits capture of a wider dynamic range of a viewed scene, while maintaining a desirable image luminance level.

A dynamic range of an imaged scene is typically greater than the dynamic range of the digital camera capturing the image. FIG. 3 depicts a typical histogram of the dynamic range ("DR") of a scene 22 and, comparatively, a dynamic range of a camera 21. The histogram of FIG. 3 shows the number of pixels ("PIXEL COUNT") within a scene at various camera luminance values ("LV"). As is apparent from FIG. 3, a camera's dynamic range is significantly less than the dynamic range of the scene. In an ideal image capture, the camera's image would reproduce all of the details of the scene, from the brightest elements to the darkest elements. In a less ideal case, the scene's brightest highlights can be clipped (clamped to a largest possible pixel value) and the scene's darkest lowlights can get masked by camera noise.

Scenes having a low dynamic range are easier to handle since an exposure setting exists that allows the camera to photograph the scene to capture all details from highlights to lowlights without clipping. However, this does not guarantee that the overall luminance of the scene is acceptable. Tonal correction may improve some of these situations. Scenes having a dynamic range exceeding that of the camera are very common and more difficult to work with. The auto exposure setting must select an exposure that will clip unimportant highlights and lose unimportant low lights. The importance of scene features is judged by the viewer and is therefore subjective. An auto exposure technique must therefore make judgments that approximate a human's perception of a scene.

The rule-based auto exposure technique employed in the embodiments described herein improves the dynamic range for a captured scene, mitigates clipping of highlights and lowlights and obtains an enhanced contrast when possible. The rule-based auto exposure is used in conjunction with conventional exposure techniques, which brings an average scene luminance to a desired pleasing luminance. The rule-based auto exposure uses tonal correction methods to expand picture dynamic range and makes it possible to make an exposure decision based on statistical data collected from different points in an image processing pipeline and in accordance with defined rules.

Embodiments may employ a tonal correction rule-based auto exposure to provide pleasing image luminance and preserve highlights. The goal of tonal correction is to reshape a histogram of a captured image to extend or compress low-key, mid-tone, and high-key regions. Tonal correction works as a transfer function between input pixel luminance and output pixel luminance. In a preferred approach, a tonal correction function is applied to each pixel signal in the digital image processing pipeline after demosaicing unit 31 and before Gamma correction is applied by unit 40.

Embodiments may also employ an auto exposure statistics engine module that collects data in, for example, three histograms and two outlier counters and which may cover, as one non-limiting example, twenty-five image windows arranged in a 5×5 grid from different spatial locations within a captured image. The twenty-five image windows provide information about spatial signal distribution over the image. The image windows are also used to detect an image having significant backlighting. The number, size, and location of the twenty-five image windows are preferably programmable. Accordingly, the window arrangement described below is merely one example of number, size, and location of image windows which may be used. The three histograms collect information from different points in the image processing pipeline to provide statistic data for flare level, percentage of clipped highlights and lowlights, and scene contrast type.

Figure 4A:
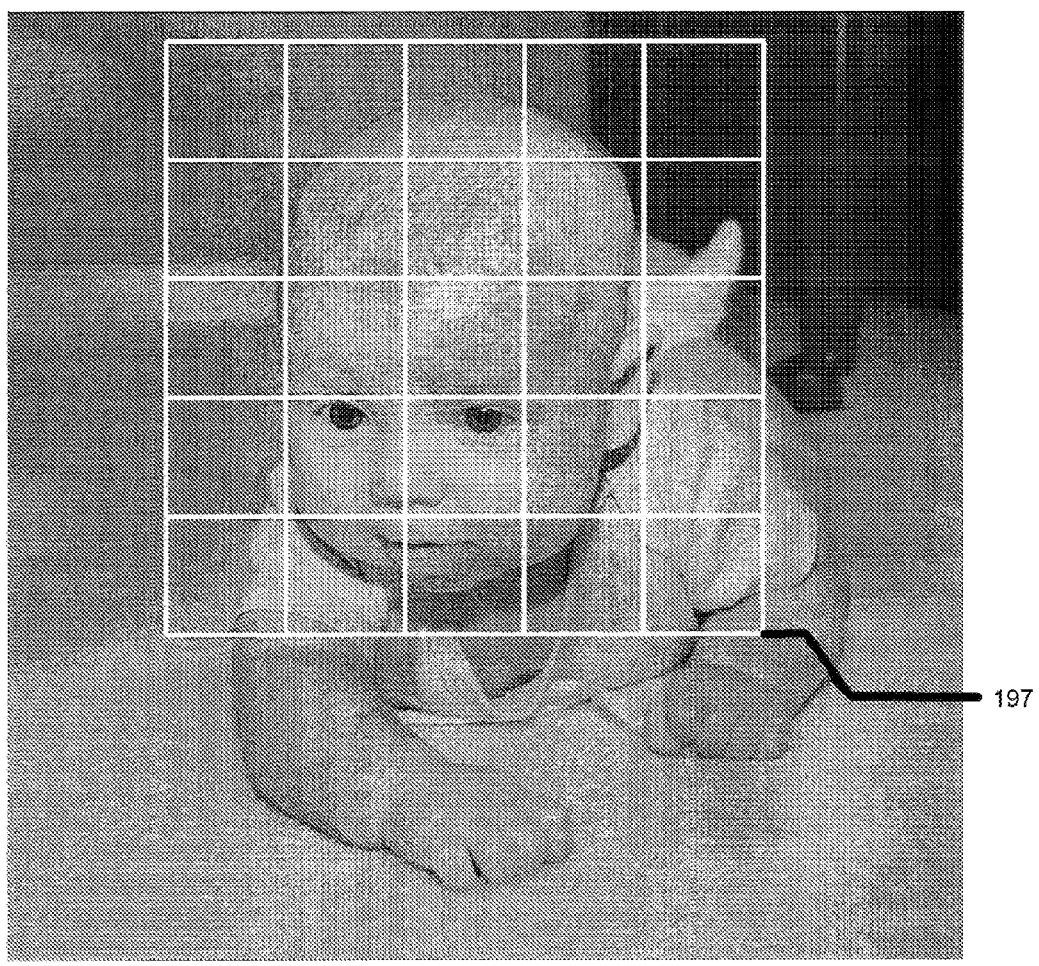
FIG. 4a depicts a scene including an image window having a grid applied to the scene.

FIG. 4a, depicts a scene including twenty-five image windows shown as a group 197, arranged, for example, in a 5×5 grid, where the position and size of the image windows are programmable. It should be appreciated that the embodiments described herein are not limited to 25 image windows and can be implemented with more or less windows if desired. Obtaining a correct exposure setting for the scene illustrated in FIG. 4a using average scene luminance to determine exposure is relatively easy to accomplish as there are no areas of very high brightness and only a few areas of very low brightness.

Figure 4B:
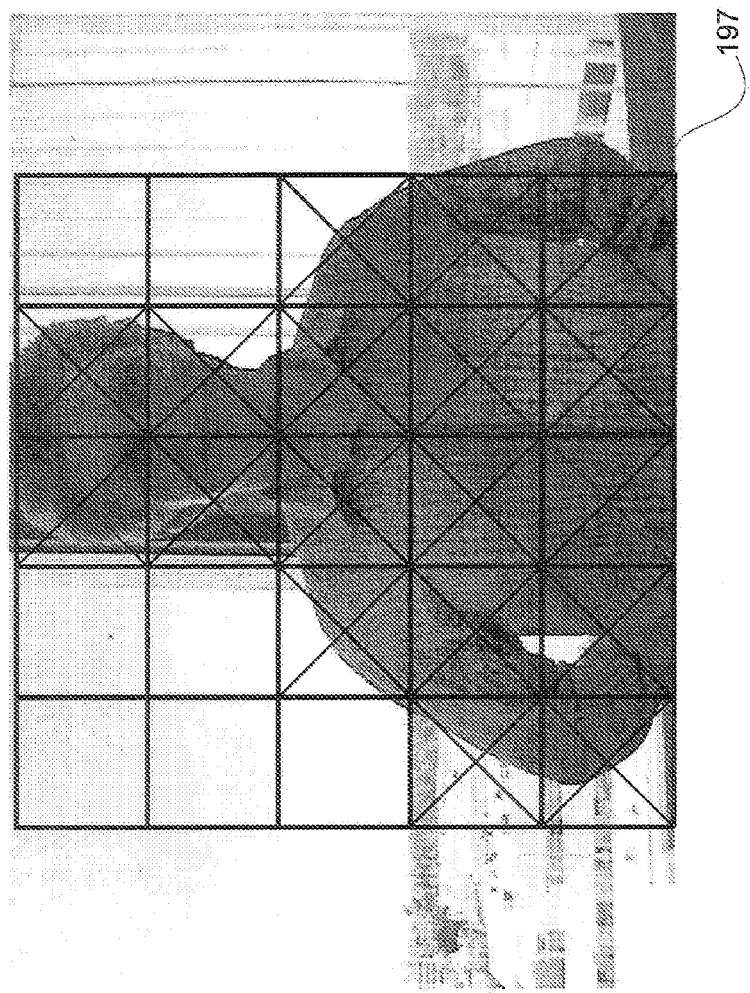
FIG. 4b depicts a backlit scene including an image window having a grid applied to the scene.

FIG. 4b, depicts another scene including twenty-five image windows shown as a group 197, arranged, for example, in a 5×5 grid, where the position and size of the image windows are programmable. Unlike the scene of FIG. 4a, the FIG. 4b scene is backlit. This scene is much harder to correctly expose using average scene luminance because of the very high brightness in the backlit areas (shown with x's in their corresponding windows. Accordingly, in embodiments described herein, such backlit areas are not used in the exposure setting determination. Thus, eighteen of the twenty-five image windows are marked with an X indicating those image windows have been identified through known backlight exposure techniques and will be used to determine the scene light value, as described below.

Figure 8:
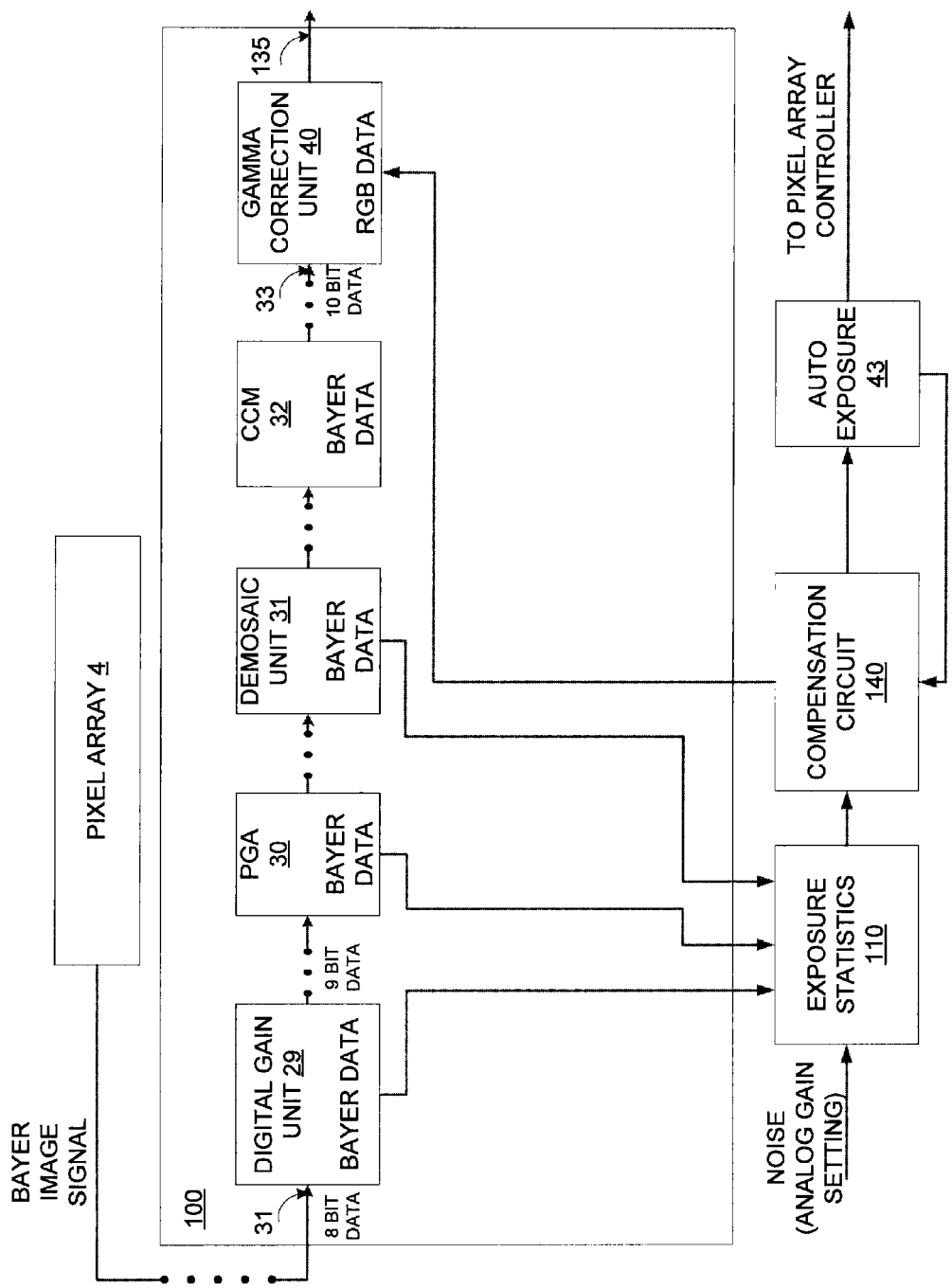
FIG. 8 depicts a portion of an image processor circuit that receives and processes image signals from a pixel array in accordance with an example embodiment.

FIG. 8 is a block diagram of a portion of an imager having an image processor 100 configured in a first embodiment. An exposure statistics collection unit 110 collects image statistics for the pixels within the windows from various locations in the image processing pipeline of the image processor 100, which are used, in accordance with the rules described below, to determine the image exposure setting. Data of histograms taken from the digital gain unit 29, the PGA 30, and the output of the demosaic unit 31 are also used.

Figure 5:
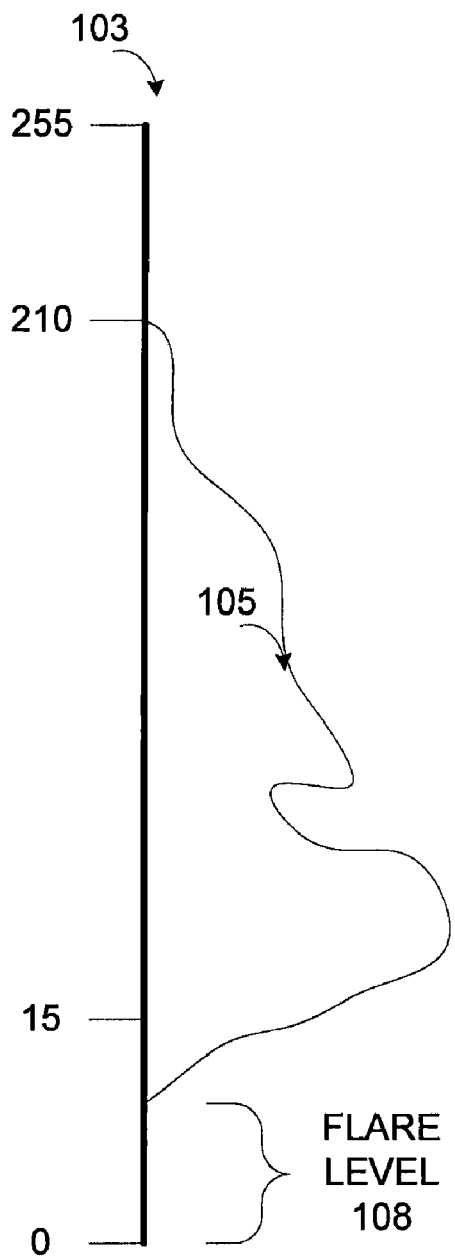
FIGS. 5, 6, and 7 depict histograms of captured image data at different points in the image processing pipeline.

FIG. 5 depicts an example first histogram 103 of statistical data of luminance for an image, reflected in curve 105 (based on a value scale of 0 to 255). Unless otherwise indicated, example histograms are based on least significant bit (LSB) values. The histogram curve 105 is based on scene data acquired from the digital gain unit 29, as discussed below with respect to FIG. 8. The first histogram 103 processes digital Bayer data from the pixels of array 4 output by the digital gain unit 29 in the image processing chain, and is used to determine pedestal data, as described below. Bayer data can be one-color or other color separated data from the captured image and used as a reference measurement where the image sensor collects image signals in a Bayer pattern of pixels. For example, signals from green pixels may be separated from the red or blue pixels signal of the Bayer color pattern and used as reference values. The flare level, i.e., the pedestal data, of the image is reflected in the histogram 103 by the signal level, Hist_0 108. Hist_0 108 is the lowest point of curve 105 that is a setoff from the 0 value by the flare level 108, which is used to determine the initial offset of the array and is used during conventional auto exposure calculations of scene luminance levels.

Figure 6:
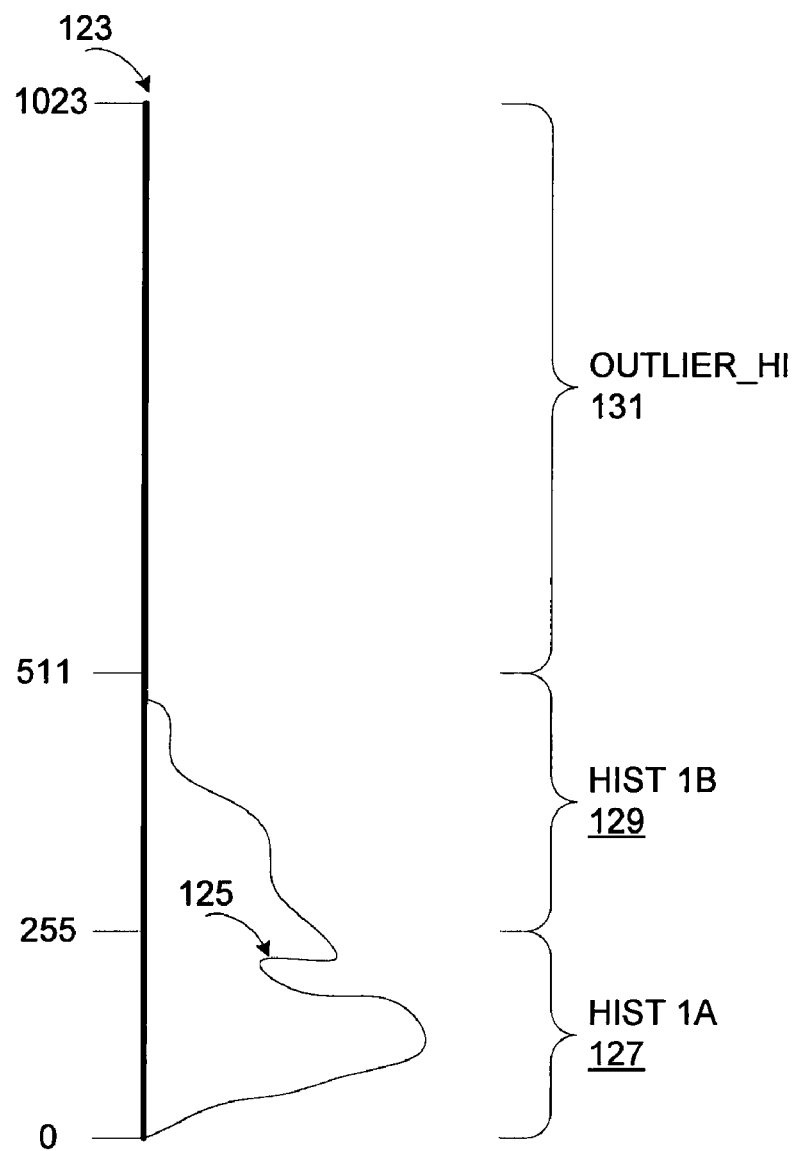

FIG. 6 depicts an example second histogram 123 of statistical data of luminance for an image, reflected in histogram curve 125 (based on a value scale of 0 to 1023). The histogram curve 125 is based on scene data acquired from the image processing chain after the PGA 30. FIG. 6 also depicts portions of the histogram 123 as histogram Hist_1A 127 and Hist_1B 129. Hist_1A 127 has a signal range from 0 to Hist1A_max (not shown) LSB, where Hist1A_max is a programmable parameter; which may be set, for example, at 255. Histogram 123 can be reflective of luminance data from one or more Bayer pixel colors in the imaging processing pipeline. Preferably, the histograms are reflective of signal information based on the luminance of the green pixels signals only. Alternatively, the histograms can be reflective of the minimum signal values of a plurality of, or all of, Red, Blue, and Green pixel signals. Data for histogram 123 may be collected after processing by the positional gain amplifier 30.

Hist_1B 129 has eight equal sized bins that cover a signal value range from 255 to Hist1B_max LSB (not shown), where Hist1B_max is a programmable parameter that, for example, may be 511. Hist_1B 129 is reflective of data in near, reachable highlights. As seen in FIG. 6, histogram 123 has some data in the value range 255-511, which is reflective of signal data in the near, reachable highlights. In an aspect, pixels having a value greater than 255LSB can be "seen" by not clipping the value of the signal after digital gain signal and lens shading correction are applied. A method for extending the dynamic range of a pixel array is described, for example, in U.S. patent application Ser. No. 11/512,302, filed Aug. 30, 2006, assigned to Micron Technology, Inc. Other methods can also be reasonably applied.

Histogram 123 is also used to track high brightness outlier values. Outlier_hi 131 counts the far, unreachable highlights over a signal range from Outlier_Top_min to Outlier_Top_max, where Outlier_Top_min to Outlier_Top_max are programmable parameters (not shown), which, for example may be set at 511 and 1023, respectively.

Figure 7:
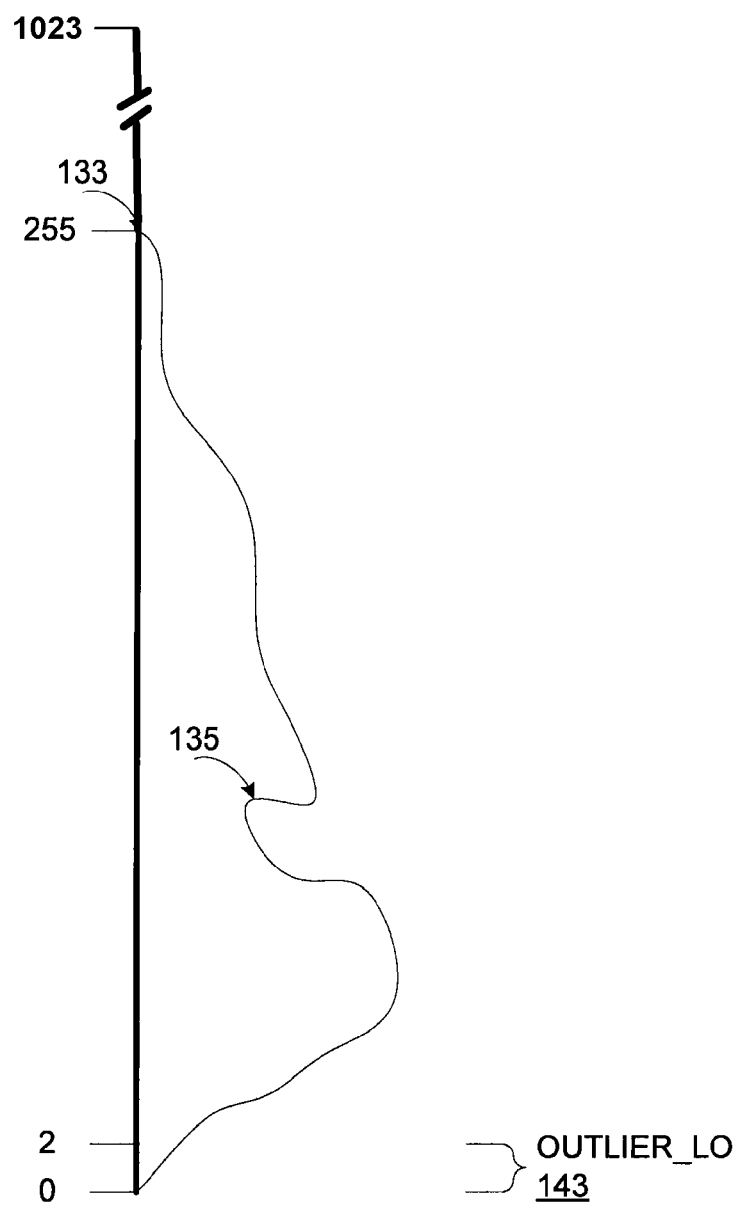

FIG. 7 depicts an example third histogram 133 of statistical data of luminance for an image, reflected in histogram curve 135 (based on a value scale of 0 to 1023). The histogram curve 135 is based on image data acquired from the image processing chain after pixel demosaicing by unit 31 or after color correction by color correction unit 33. Histogram curve 135 is used to track low outlier values. Outlier_lo 143 counts the low, unreachable lowlights over a signal range from Outlier_Bottom_min to Outlier_Bottom_max, where Outlier_Bottom_min to Outlier_Bottom_max are programmable parameters (not shown), which, for example, may be 0 and 8, respectively. This data is taken before Gamma correction. Although the demosaiced RGB data may be ten bits in length, the histogram 133 is based on only the lower 8 bits of pixel data.

Referring again to FIG. 8, the histogram data reflected in FIGS. 5, 6, and 7 are taken after the digital gain unit 29, PGA 30, and demosaic unit 31, respectively. However, the location in the pixel processing pipeline at which the histogram data is taken is not as important as the information acquired by the histograms in terms of using data to show logistics of flare level (FIG. 5), and tracking high brightness outliers (FIG. 6) and low brightness outliers (FIG. 7).

The compensation unit 140 receives statistics data collected by the statistics collection unit 110. The compensation unit 140 processes and applies this collected image data, as described below, to improve the exposure of the captured image.

Figure 10A:
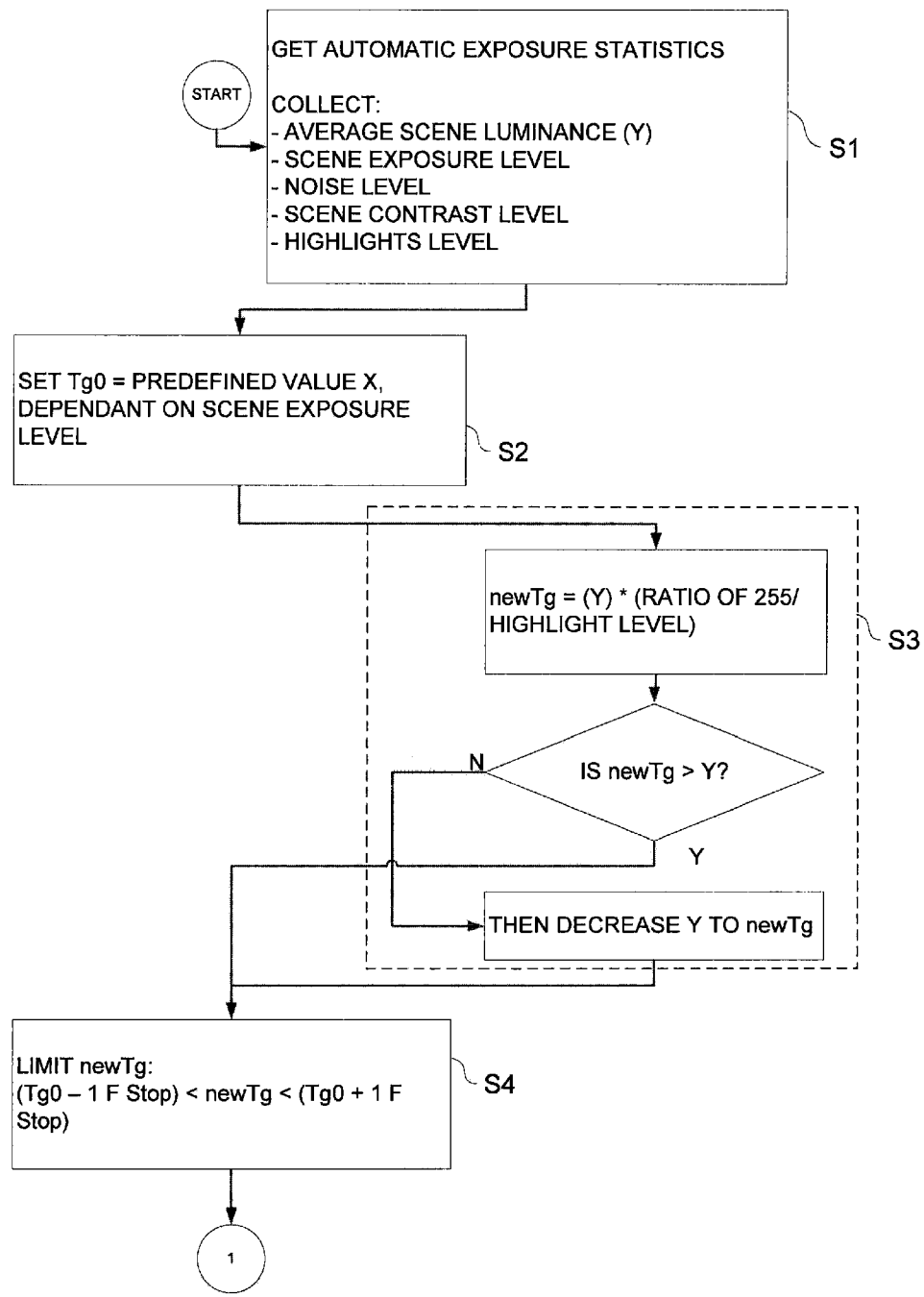
FIGS. 10a to 10c illustrate a flow diagram for applying an light value compensation technique according to an embodiment.
Figure 10B:
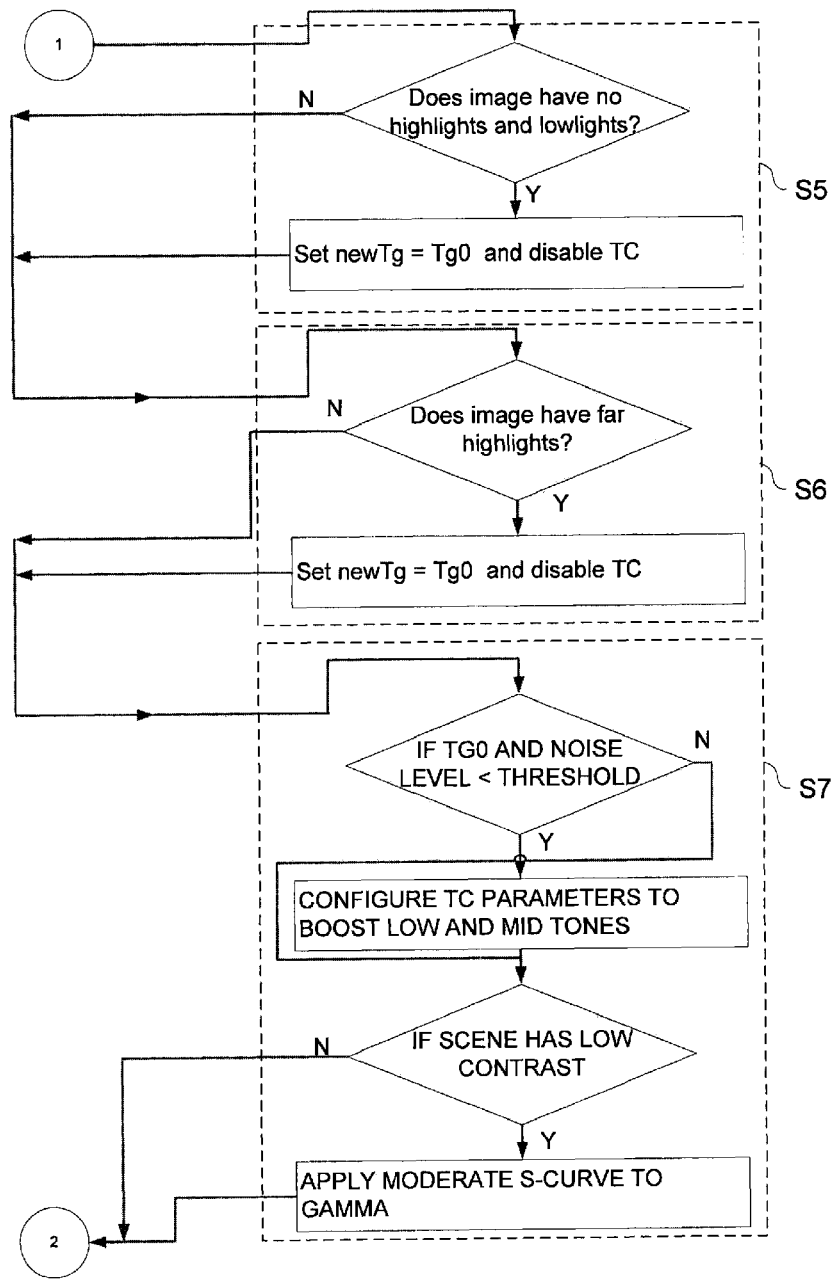
Figure 10C:
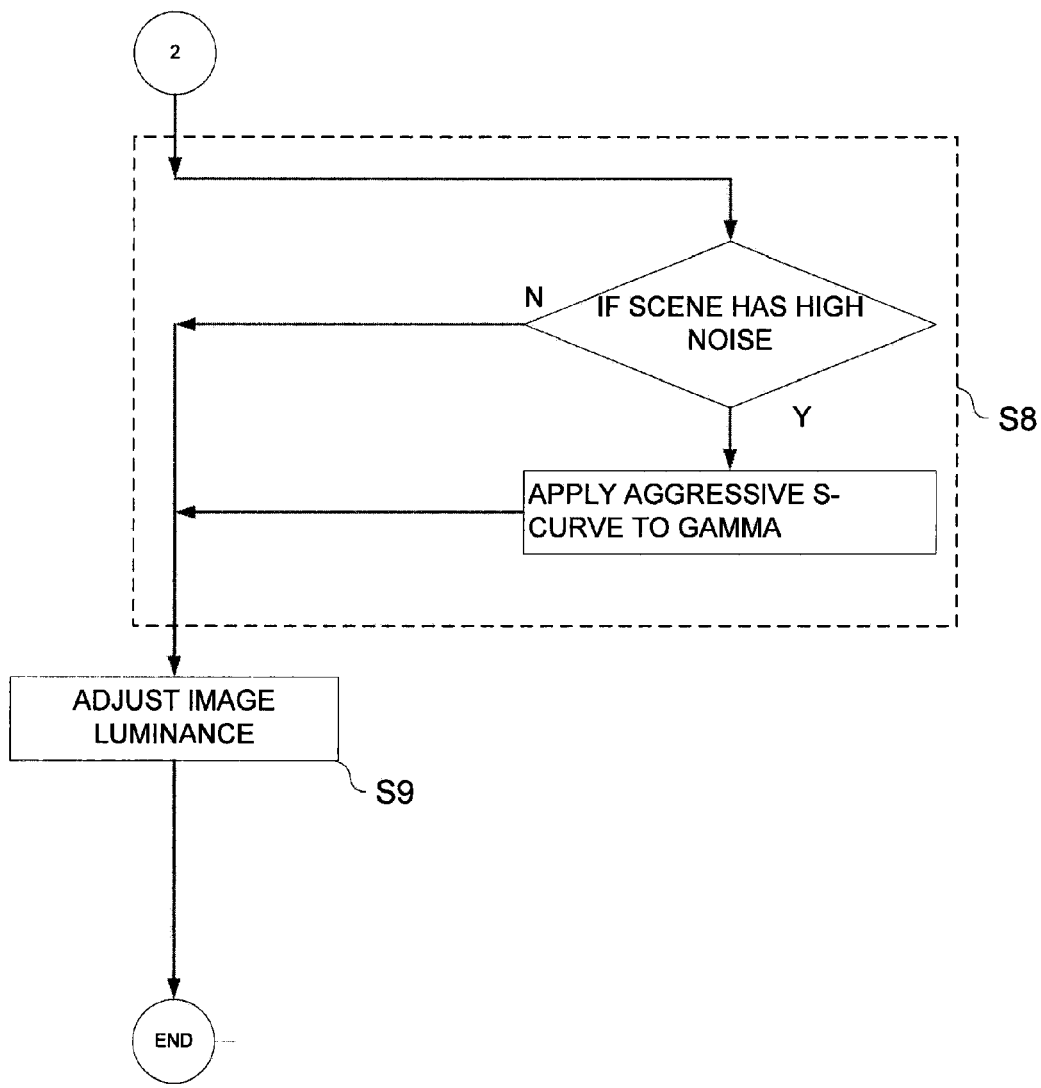

The compensation unit 140 employs several steps, shown in FIGS. 10a-c, to improve an acquired image. The steps are described as follows.

At Step S1, the compensation unit 140 gathers statistics from a pre-capture image, which is a non-outputted image used to acquire information on an image for exposure determinations. In an alternative approach, the function of the exposure statistics unit 110 may gather the statistics from a pre-capture image. The exposure statistics include average scene luminance, scene light value level, noise level, scene contrast level and highlights level, described below.

Average scene luminance is calculated as the average of average luminance of the 25 image windows (no backlight). The compensation unit 140 also employs known backlight determination techniques to determine if the image is significantly effected by backlighting. A method for determining backlight in a digitally captured image is described, for example, in U.S. patent application Ser. No. 11/513,570, filed Aug. 31, 2006, assigned to Micron Technology, Inc. Other methods can also be reasonably applied. Thus, for example, the luma of the twenty-five different image windows, e.g., $Y1+Y2+\ldots+Y25$, is averaged to provide the average scene luminance:

$$Y=(Y1+Y2+\ldots+Y25)/25 \qquad (1)$$

If the image is significantly impacted by backlight such as in the FIG. 4b scene, then the average scene luminance is calculated as an average of images windows covering the backlit object (backlight is detected), using the image windows 197 of the scene, for example, as depicted in FIG. 4b. Thus, the eighteen of the twenty-five image windows are used to determine the average scene light value. Thus, the eighteen image windows will be averaged to provide the average scene value as follows:

algorithm, where there is a value X dependant on the value of LV. The luminance target is typically pre-defined by a programmable array having a value X that corresponds to Tg0 LV and is conventionally known how to implement. Once X is determined, Tg0 is set equal to X.

For example, designers may create or use a pre-determined lookup table to be used in this step, where different light values, "LV," have corresponding target values, "Tg0":

TABLE 1

EXAMPLE LOOK-UP TABLE

| LV | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Tg0 | 40 | 42 | 44 | 48 | 50 | 55 | 60 | 60 | 60 | 60 | 65 | 70 | 75 | 80 | 80 | 85 | 90 |

$$Y=(Y3+Y4+Y8+Y9+Y12+\ldots+Y25)/18 \quad (2)$$

Scene light value level is computed by determining an light value ("EV") for every image window based on an average window luminance, integration time and total gain (analog and digital). The scene light value is calculated as an average light value over all image windows (no backlight). In a determined backlit scene, scene light value is calculated as an average light value over all image windows covering a backlit object. Light value Level is a standard metric in photography and calculated as:

$$EV=A0+\log 2(\text{Average Luminance/integration time/Gain}) \quad (3)$$

Where A0 is a calibrating parameter selected in such way to provide EV=0 for 1 sec exposure at f/1 with ISO100 speed.

Noise level is defined by the applied analog gain level during the image processing chain. The more analog gain that is applied during the image processing, the higher the noise level that is added to the image. To estimate whether an image has a high noise level, the gain value is compared with pre-defined threshold, If the gain value is larger then the pre-defined threshold, the captured scene has high noise level as a result of the Scene contrast level is defined as the difference between maximum and minimum light value over all 25 image windows in a non-backlit scene. This is computed by, for example, first calculating the twenty-five light values (for each image window). Then, determining the maximum and minimum light values and the difference between them. For example, if max EV=10 and min EV=5, then the scene contrast value is 10−5=5.

Highlights level is calculated as maximum signal level represented in the histogram 103 of FIG. 5. For example, in histogram 103, the maximum signal level is approximately at the 500 value.

At step S2, a luminance target is set as Tg0, which is determined based on the average light value over all the image windows of FIG. 4a. In backlit scenes, the luminance target is set as Tg0, which is determined based on the average light value over all certain image windows of FIG. 4b, e.g., those image windows marked with an "X." The luminance target is scene dependant and makes the same scene look differently at lowlight and bright light conditions. For example, average picture luminance for an image taken in open sunlight should be brighter then a picture taken of the same scene on a cloudy day. Furthermore, a picture taken on a cloudy day should be brighter than a picture of the same scene taken at sunset or at night. The light (LV) value comes from the auto exposure Thus, if the light value is determined to be 5 for the current scene light value, then Tg0=55. In another example, if the light value is determined to be 13 for the current scene, then Tg0=80.

At step S3, a maximum average scene luminance "newTg" is defined that does not clip highlights. newTg is calculated as a product of current average scene brightness (luminance) Y and the ratio between the maximum not clipped signal and the maximum signal level in the scene as defined by the relevant histogram; i.e., FIG. 6, which shows a typical histogram 123 for a captured scene that contains some clipped highlights. In an example using the histogram 123 of FIG. 6, average image brightness is determined to be approximately 100. Then, 255 is the maximum not clipped signal level whereby all image pixels having signal level above 255, i.e., in the range Hist_1B 129, will be clipped to the signal level 255. Although 255 is chosen based on an 8-bit scale, the embodiments are not so limited and other appropriate values can be chosen.

In the histogram 123 of FIG. 6, the maximum signal value, which is part of the highlights level, has a signal value of approximately 500. Therefore, to avoid signal clipping, average brightness is reduced by the ratio of the maximum not clipped signal level to the maximum signal value. For example, newTg=100*255/500=51. Additionally, the newly determined maximum luminance target value is compared to the current average luminance level, i.e., to determine whether newTg>Y. If the value of newTg is larger then current average image luminance, e.g., Y, that means the current average image luminance Y can be increased up to newTg without highlight clipping. In the case that the value of newTg is below the average image luminance Y, then average image luminance Y has to be decreased down to newTg to avoid clipping. For example, if Y=45 and calculated newTg=Y*255/500≈23, then step S3 requires that exposure settings be changed in such a way that the average image luminance Y changes from 15 to 7 to avoid clipping.

At step S4, it is determined whether newTg should be further limited to be within a certain range. If the average image luminance Y has to be decreased to avoid highlight clipping, or increased to avoid lowlight cutting, minimum and maximum luminance levels limits, which are programmable, are set to be Tg0 plus/minus 1F stop, depending on whether the luminance is increased or decreased. For example, if histogram Hist_B indicates the presence of a significant number of highlights, where the significance is based on a pre-defined threshold, then:

a. The exposure of the image is decreased to capture at least some of the significant highlights. In an example approach, a minimum allowed average image luminance is Tg0 minus 1F-stop or one light value level.

b. As part of the compensation for highlights, any highlights above a certain threshold are clipped. In an example approach, highlights that have an light value of 16 or higher are clipped.

At step S5, newTg may be adjusted depending on scene highlights or low lights. newTg is set to Tg0 if the scene does not have highlights and lowlights, which can be determined by examining hist_1B to detect the presence of highlights and Outlier_Lo to detect the presence of lowlights. Thus, if the new image luminance level determined at step S3 were newTg=Tg0 (no highlights, e.g., not one pixel in the whole scene is clipped—not one pixel has a signal value >254) and outlier counter Outlier_lo shows no significant lowlights, then newTg=Tg0 and a tonal correction is disabled.

If the scene contains "far" highlights, i.e., the outlier_Hi values compared with a predefined threshold, which will be clipped anyway (even if the image luminance is reduced by 1 F-stop), then the brightness is not reduced and the highlights are clipped. Thus, brightness target newTG is set to Tg0 and tonal correction is not applied to the image. Thus, at step S6, newTg may be further adjusted depending on scene far highlighting. newTg is set to Tg0 if the scene contains significant "far" highlights, based on the determination of Outlier_hi. If a significant number of "far" highlights are present, then newTg is set to Tg0 and tonal correction is disabled (i.e., not performed). If the ratio between the determined "far" highlights and "near" highlights is larger than a predefined threshold, then a predetermined portion of the highlights are clipped and tonal correction is not applied. If a scene has bright areas with signal values >255 and <511, then hist_1B data (FIG. 6) will reflect how many pixels reflect these values, which are referred to as "near highlights". Typically all those pixels are clipped because signals with values >255 generally cannot be seen. If a scene has very bright areas with signal values >511 then these signal values are referred to as "Far highlights" and Outlier_Hi (FIG. 6) provides the number of pixel signals having "Far highlights".

Tonal correction parameters are set at step S7. If the scene has no significant highlight and there are lowlights present, the image exposure is increased to more fully capture the lowlights. Thus, luminance should be increased, but should not be increased to the point that it would clip highlights. The luminance should not be increased beyond a MaxLuminance value, where the MaxLuminance value depends on scene LV. For general indoor and outdoor scenes under normal bright illumination, MaxLuminance is Tg0 plus 1F stop. For dark (e.g., night) scenes, LV is close to Tg0 to avoid the scene from appearing unnaturally bright. In that case, the tonal correction is disabled. Tonal correction is based on a conventionally known s-curve, which is also referred to as a gamma curve or gamma correction, where the s-curve is utilized to lower the signal values of highlight areas and boost the signal values of lowlight areas. Tonal correction is an example approach only used when image luminance is decreased to preserve highlights and the noise level is low (i.e., below a pre-defined threshold). For example, if the newTg value defined in steps S3-S6, Tg0 and the determined noise level are below a certain threshold, then the compensation unit 140 calculates tonal correction parameters to boost low and midtones (gain coefficient=Tg0/newTg) and compress highlights. For example, a highlight knee for the image data is calculated using conventional techniques. This can be seen for example in the graph of FIG. 9, which depicts image gain compensation having an extended dynamic range for highlights. In this step, the knee point "KP" is taken into consideration in the scene exposure and compensation. Thus, tonal correction is applied with the determined highlight knee point to preserve highlights and bring average luma to Tg0 luminance level.

Figure 9:
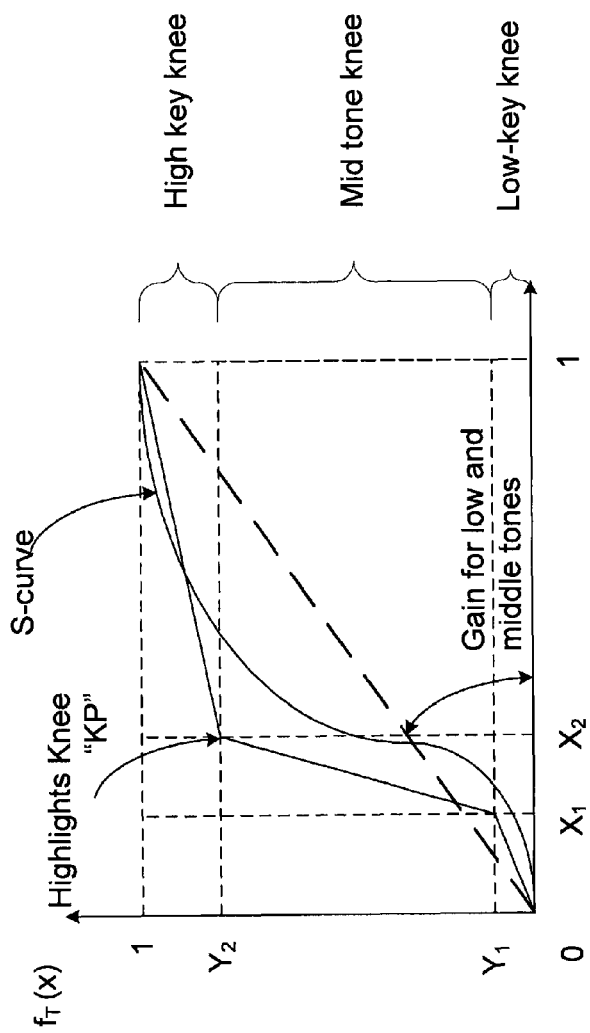
FIG. 9 depicts image gain compensation having an extended dynamic range for highlights.

Tonal correction is a reflection of a digital gain value applied to each pixel in the image to reshape the luminance histogram to extend or compress low-key, mid-tone and high-key regions. The gain value is defined by tonal correction curve and depends on pixel luminance. For example, if tonal correction curve has a shape as shown in FIG. 9, the gain applied to a pixel with luminance X is k=Y/X.

S-Curve parameters are configured at step S8. As noted above, in certain situations tonal correction is not applied. In this step the compensation circuit enables/disables S-Curve compensation based on statistic data gathered at step S1. If the scene has low contrast, and therefore low noise, a moderate S-Curve is applied as a Gamma correction. In the case of high noise level in the scene, an aggressive S-Curve is applied as a gamma correction.

Image luminance is adjusted at step S9. Prior steps S1-S8 are applied to an image that is captured prior to the desired image being captured. As is conventionally known in digital photography, when a camera's shutter button is pressed, the digital camera captures several images prior to capturing the desired image. The processing system of the digital camera uses the pre-desired captured images for a variety of tasks, including exposure processing. In this step the compensation unit calculates new exposure compensation parameters corresponding to the newTg luminance level and uploads the parameters to image sensor and image processing pipeline to be used when capturing the desired image. The new parameters are then used as the basis for the exposure using the calculated average scene luminance. These parameters may be calculated, for example, in the auto exposure unit 43 of FIG. 8 and then provided to the compensation unit 140 to be applied to a desired captured image.

Thus, at the conclusion of the process, an improved image is outputted, having an increase in preserved highlights and lowlights and with an appropriate tonal correction for a captured desired image.

Using conventional techniques, the image processing system determines whether the subject of the captured image has significant backlighting. If backlighting is determined, then the above described process is performed with a variation to compensate for the backlight. More specifically, average object luminance (FIG. 4b) is utilized in place of average scene luminance at steps S1-S3. As noted above, a method for addressing backlighting is described, for example, in U.S. patent application Ser. No. 11/513,570.

Figure 11:
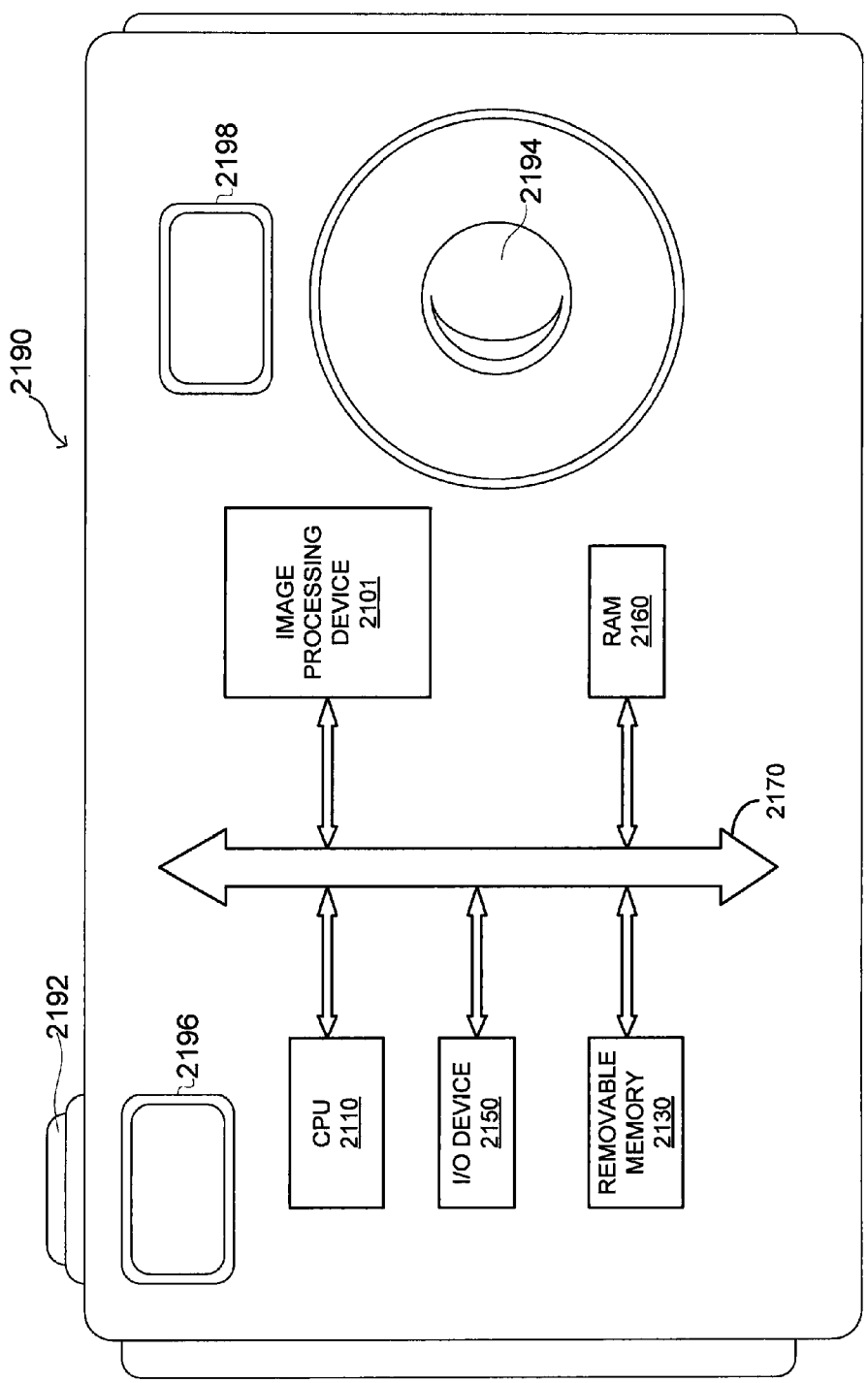
FIG. 11 is a block diagram representation of a system, e.g., a camera system, incorporating an embodiment described herein.

FIG. 11 is a block diagram representation of an image processor system, e.g., a camera system 2190, incorporating an image processing device 2101, which includes an image processing circuit similar to the circuit 100 of FIG. 8, in accordance with an embodiment described herein. The video or still camera system 2190 generally comprises a shutter release button 2192, a view finder 2196, a flash 2198 and a lens system 2194. The camera system 2190 generally also comprises a central processing unit (CPU) 2110, for example, a microprocessor for controlling camera functions that communicates with one or more input/output devices (I/O) 2150 over a bus 2170. The CPU 2110 also exchanges data with random access memory (RAM) 2160 over bus 2170, typically through a memory controller. The camera system may also include peripheral devices such as a removable memory 2130 that also communicates with CPU 2110 over the bus 2170. Image processing device 2101 is coupled to the processor system and includes the embodiments of a image light value compensation unit as described herein. Other processor systems which may employ video processing devices 2101 include computers, PDAs, cell phones, scanners, machine vision systems, and other systems employing image processing operations.

While the embodiments have been described and illustrated with reference to specific embodiments, it should be understood that many modifications and substitutions could be made without departing from the scope of the claimed invention. Accordingly, the claimed invention is not to be considered as limited by the foregoing description but is only limited by the scope of the appended claims.

What is claimed as new and desired to be protected by Letters Patent of the United States is:

1. A method for using an image processor, comprising:
   with an image processing chain in the image processor, receiving image signals representing an image;
   with the image processing chain, collecting automatic exposure data for a scene;
   with the image processing chain, setting a luminance target level to an initial value;
   with the image processing chain, determining a maximum value for the luminance target level, wherein determining the maximum value includes calculating the maximum value based on an average scene luminance multiplied by a predetermined constant and calculating the maximum value if the luminance target level clips highlights of the scene;
   with the image processing chain, adjusting the luminance target level from its initial value to the maximum value;
   with the image processing chain, adjusting tonal correction parameters;
   with the image processing chain, adjusting S-curve parameters; and
   with the image processing chain, adjusting image parameters for the scene and providing the image parameters to an image processing circuit for processing the scene.

2. The method defined in claim 1 wherein the average scene luminance is determined based on average luminance values associated with a plurality of image windows.

3. The method defined in claim 1 wherein the average scene luminance is determined based on average luminance values associated with image windows that cover a backlit object if backlighting is determined to be present in the scene.

4. The method defined in claim 1, wherein collecting the automatic exposure data comprises:
   collecting a scene exposure level, noise level, scene contrast level, and a highlights level of the scene based on a plurality of image windows.

5. The method defined in claim 4, wherein adjusting the tonal correction parameters comprises:
   adjusting the tonal correction parameters to increase low and midtones of the scene if the luminance target level and the noise level of scene are below respective thresholds.

6. A method of capturing an image, comprising:
   examining light levels within a scene;
   setting an exposure level for the scene;
   setting a luminance target level to an initial value for scene exposure based on the exposure level;
   adjusting the luminance target level from its initial value to a new value, wherein adjusting the luminance target level includes:
   determining the new value for the luminance target level based on an average scene luminance level and a level of scene highlights; and
   determining whether the new value exceeds the average scene luminance level; and
   in response to determining that the new value is less than the average scene luminance level, decreasing the average scene luminance level to the new value;
   using the adjusted value of the luminance target level to determine a new exposure level for the scene; and
   capturing an image with the new exposure level.

7. The method of claim 6, wherein adjusting the luminance target level from its initial value to the adjusted value further includes:
   limiting the new value to be within a specific range of values based on the initial value of the luminance target level.

8. The method of claim 6, further comprising:
   determining if a scene has no highlights beyond a first threshold value or lowlights lower than a second threshold value, and if so, resetting the luminance target level from its new value to the initial value.

9. The method of claim 8, further comprising:
   determining if a scene has no highlights beyond a third threshold value that is higher than the first threshold, and if so, resetting the luminance target level from its new value to the initial value.

10. The method of claim 6, wherein the average scene luminance level excludes at least some windows in backlit areas of the scene.

11. The method of claim 6, further comprising:
    applying tonal correction to the captured image.

12. The method of claim 11, wherein applying the tonal correction comprises:
    determining a noise level associated with the captured image; and
    in response to determining that the noise level is lower than a first threshold, boosting the level of low and mid tones in the captured image.

13. The method of claim 12, wherein applying the tonal correction further comprises:
    determining a contrast level associated with the captured image;
    in response to determining that the contrast level is lower than a second threshold, applying a moderate S-curve to the captured image.

14. The method of claim 12, wherein applying the tonal correction further comprises:
    determining a contrast level associated with the captured image;
    in response to determining that the contrast level is lower than a third threshold, applying an aggressive S-curve to the captured image.

15. The method of claim 13, wherein applying the tonal correction further comprises:
    in response to determining that the noise level is greater than a fourth threshold, applying an S-curve to the captured image, wherein the S-curve is steeper than the moderate S-curve.

* * * * *